UNITED STATES PATENT OFFICE.

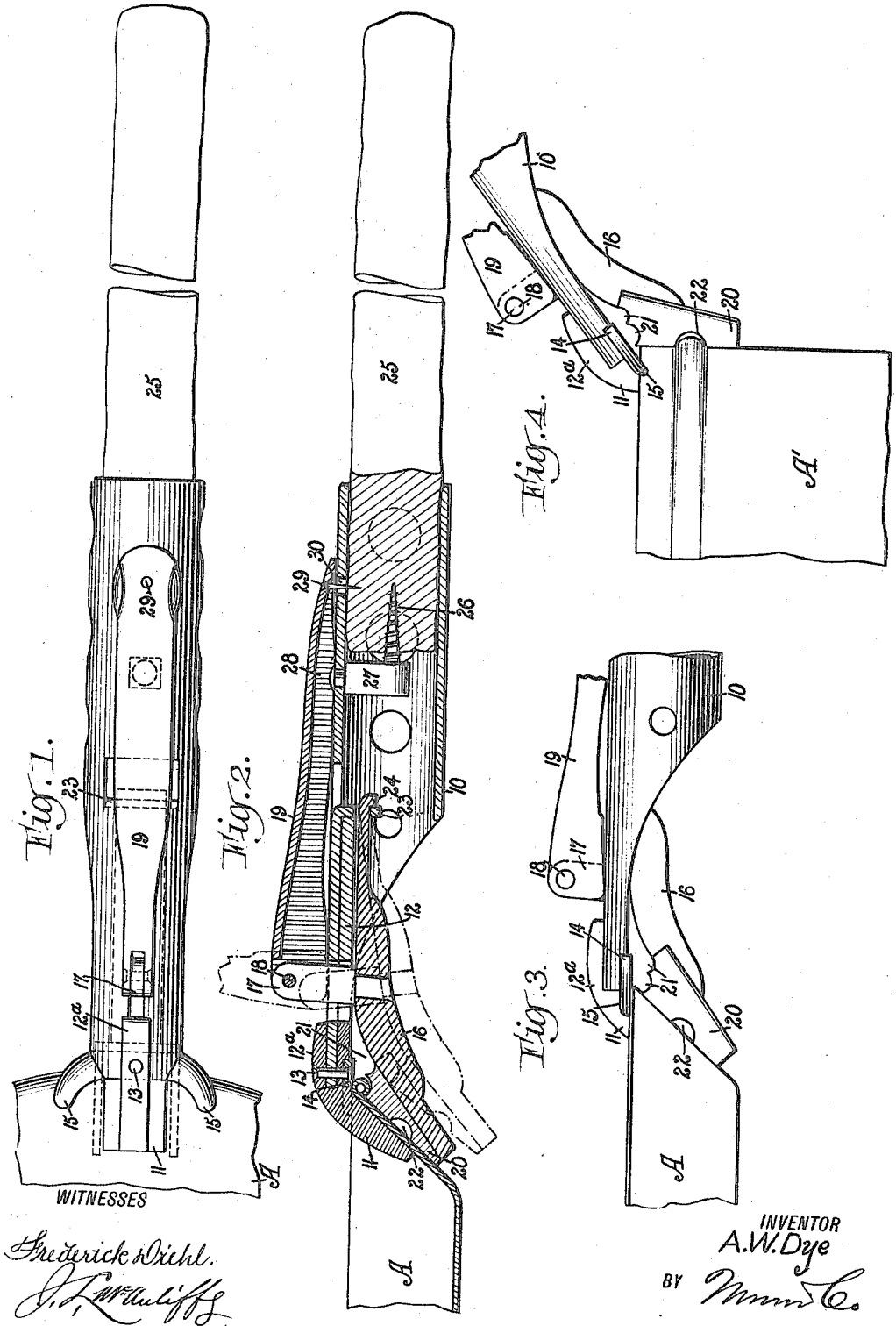

ARTHUR WILLIAM DYE, OF GLOVERSVILLE, NEW YORK.

ATTACHABLE HANDLE.

1,264,031.  Specification of Letters Patent.  Patented Apr. 23, 1918.

Application filed July 20, 1917. Serial No. 181,895.

*To all whom it may concern:*

Be it known that I, ARTHUR W. DYE, a citizen of the United States, and a resident of Gloversville, in the county of Fulton and State of New York, have invented a new and Improved Attachable Handle of which the following is a full, clear, and exact description.

My invention relates to handles adapted to be attached to pans, dishes, and the like. More particularly the invention is embodied in a handle of the class described especially adapted for use on dishes, shallow pans, and the like for frying over camp fires.

An object of the invention is to improve handles of the class described with respect to the form and arrangement of the jaws and the operating means for the movable jaw.

A further important object is to provide means for securing an extension handle which may be cut from green wood and applied to the permanent handle member of the device, the attaching means serving to securely hold the extension wood handle even after shrinkage thereof.

The nature of the invention and its advantages will more clearly appear as the description proceeds.

Reference is to be had to the accompanying drawings forming a part of this specification in which similar reference characters indicate corresponding parts in all the views, it being understood that the drawings are merely illustrative of one example of the invention.

Figure 1 is a plan view of my improved attachable handle applied to a pan or dish, a portion of which is shown;

Fig. 2 is a longitudinal vertical section;

Fig. 3 is a fragmentary side elevation showing the device applied;

Fig. 4 is a view similar to Fig. 1 showing the application of the handle to a different form of cooking utensil.

In carrying out my invention in accordance with the illustrated example, a tubular metallic handle 10 is provided, and formed on or secured to said handle at the front end is a fixed jaw 11, here shown as formed with a shank 12 extending within the handle 10 at the top and with a rearwardly extending member 12ª spaced from the shank 12 to receive the forwardly projecting top of the handle 10. A rivet 13 secures the jaw to the body, said rivet passing through the shank 12 and member 12ª and through a cross bar 14 which is let into the jaw 11 at the under side and extends at both sides of the said jaw in the form of forwardly projecting lugs 15. The lugs 15 are adapted to bear on the top of the rim of a pan or dish A while the jaw 11 is positioned over the rim.

A movable jaw 16 is provided beneath the fixed jaw 11, and secured to or formed on the said jaw 16 is an upstanding member 17 which extends through holes in the shank 12 at the top of the body 10, above the latter. The upper end of the member 17 is secured by a transverse pivot 18 to the forward end of a cam lever 19 whereby the lever 16 will be hung between its ends from the said cam lever for vertical rocking movement. The gripping face 20 of the jaw 16 is formed at the top with depressions 21, either of which will accommodate the bead on the rim of the dish or vessel A according to the extent to which the said bead projects. In the said face below the depressions 21 is a groove or recess 22 which will accommodate the bead of a vessel A' formed on the said vessel below the top as shown in Fig. 4. The rear end of the movable jaw 16 extends into the tubular handle 10 and is received in a slot presented by a transverse loop 23 in fixed relation to and depending from the top of the body 10. Said loop 23 is preferably made by slotting and bending down the material of the handle 10.

With the described arrangement the device is placed on the dish with the jaw 11 at the top and the jaw 16 below or at the outer side of the rim of the vessel. The lugs 15 prevent twisting or turning of the dish. With the dish positioned between the jaws the lever 19 is lowered to the position shown in Fig. 2, thereby closing the jaw 16 tightly, said jaw freely rocking on the loop 23. The short handle 10 and its capability of being readily attached to or detached from the dish makes it convenient for camp use as well as for general purposes, but in cooking over a camp fire a long handle is exceedingly desirable for which reason I make provision for attaching an extension handle 25 which may, and usually will be cut from green wood. In order to retain the extension handle 25 in position even in the case of material shrinkage, I provide means to positively fasten it to the handle 10. The tubular form of the handle constitutes its rear end a socket for the handle 25 and to secure the end of said handle, I provide a screw 26 disposed axially and rearwardly in the socket portion of the handle 10. Advantageously, the screw 26 is rigid with a transverse block 27 depending from the top of the handle 10 and in the example shown riveted as at 28 to the top of the handle. In addition to holding the extension handle 25 by the screw 26 I form or secure to the rear end of the cam lever 19, at the under side, a pin or spur 29 which is adapted to be projected downwardly through a hole 30 in the handle 10 at the top, and to the interior of said handle 10, and caused to penetrate the wood of the extension handle 25.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. In a device of the class described, a tubular handle, a fixed jaw thereon at the front adapted to be positioned over the rim of the article to be held, a cam lever on the said handle at the top, a movable jaw disposed beneath the fixed jaw and extending into the said handle, means by which the movable jaw is pivotally hung between its ends on the said lever, and means on the handle at the interior with which the movable jaw is rockably held rearwardly of the point of connection with the said lever.

2. In a device of the class described, a tubular handle, a fixed jaw thereon at the front, a movable jaw beneath the fixed jaw and extending at its rear end into the said handle, a fixed loop on the handle at the interior through which the rear end of the movable jaw extends and in which it is rockably supported, a cam lever on the handle at the exterior, at the top thereof, and means extending through the handle from the said lever and pivotally connecting the movable jaw to the lever between the ends of said jaw.

3. In a device of the class described, a tubular handle, a fixed jaw thereon, a second jaw movable relatively to the fixed jaw, an actuating lever connected with the movable jaw and disposed at the exterior of the handle, the said handle at its rear end constituting a socket to receive an extension handle, fastening means within the tubular handle at the inner end of said socket to engage the extension handle, and a spur on the cam lever adapted to project in the closed position of the lever into the tubular handle to engage laterally with the extension handle.

4. In a device of the class described, a tubular handle, jaws on said handle at the front end, the rear end of said handle constituting a socket to receive an extension handle, a member disposed laterally in the tubular handle at the inner end of the socket portion, and a screw on said member and disposed rearwardly in the socket portion to engage the end of the extension handle.

ARTHUR WILLIAM DYE.

Copies of this patent may be obtained for five cents each, by addressing the "Commissioner of Patents, Washington, D. C."